US006597325B2

(12) United States Patent
Judd et al.

(10) Patent No.: US 6,597,325 B2
(45) **Date of Patent: *Jul. 22, 2003**

(54) TRANSMIT/RECEIVE DISTRIBUTED ANTENNA SYSTEMS

(75) Inventors: Mano D. Judd, Rockwall, TX (US); Thomas D. Monte, Lockport, IL (US); Donald G. Jackson, Richardson, TX (US); Greg S. Maca, Rockwall, TX (US)

(73) Assignee: Andrew Corporation, Orland Park, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/422,418

(22) Filed: Oct. 21, 1999

(65) Prior Publication Data

US 2002/0011954 A1 Jan. 31, 2002

Related U.S. Application Data

(63) Continuation-in-part of application No. 09/299,850, filed on Apr. 26, 1999.

(51) Int. Cl.[7] .......................... H01Q 1/38; H04B 7/185
(52) U.S. Cl. ........................ 343/853; 343/890; 342/854
(58) Field of Search ................................ 343/853, 824, 343/700 MS, 890, 891, 892; 455/450; 257/275

(56) References Cited

U.S. PATENT DOCUMENTS 4,124,852 A 11/1978 Steudel ........................ 343/854
4,246,858 A 1/1981 Mailloux ..................... 343/854
4,360,813 A 11/1982 Fitzsimmons ............... 343/100
4,566,013 A 1/1986 Steinberg et al. ........... 343/372
4,607,389 A * 8/1986 Halgrimson ................. 455/11

(List continued on next page.)

FOREIGN PATENT DOCUMENTS

| | | | | |
|---|---|---|---|---|
| EP | 0551 556 A1 | 7/1993 | | |
| EP | 0 994 567 A2 | 4/2000 | | |
| GB | 2286749 A | 8/1996 | ............ | H04B/7/08 |
| JP | 08-102618 | 4/1996 | | |
| JP | 11-330838 | 11/1999 | | |
| WO | WO95/26116 | 9/1995 | ............ | H04Q/7/36 |
| WO | WO 95/34102 | 12/1995 | ............ | H01Q/1/38 |
| WO | WO 98/09372 | 3/1998 | ............. | H03E/1/32 |
| WO | WO 98/11626 | 3/1998 | .......... | H01Q/23/00 |
| WO | WO 98/50981 | 11/1998 | ............ | H01Q/3/40 |

OTHER PUBLICATIONS

Levine, E., Malamud, G., Shtrikman, S., and Treves, D., "A study of Microstrip Array Antennas with the Feed Network," IEEE Trans. Antenna Propagation, vol. 37, No. 4, Apr. 1989, pp. 426–434.

(List continued on next page.)

*Primary Examiner*—Don Wong
*Assistant Examiner*—James Clinger
(74) *Attorney, Agent, or Firm*—Wood, Herron & Evans, L.L.P.

(57) ABSTRACT

A distributed antenna device includes a plurality of transmit antenna elements, a plurality of receive antenna elements and a plurality of power amplifiers. One of the power amplifiers is operatively coupled with each of the transmit antenna elements and mounted closely adjacent to the associated transmit antenna element, such that no appreciable power loss occurs between the power amplifier and the associated antenna element. At least one of the power amplifiers is a low noise amplifier and is built into the distributed antenna device for receiving and amplifying signals from at least one of the receive antenna elements. Each said power amplifier is a relatively low power, relatively low cost per watt linear power amplifier chip.

50 Claims, 10 Drawing Sheets

U.S. PATENT DOCUMENTS

| | | | | | |
|---|---|---|---|---|---|
| 5,825,762 | A | | 8/1986 | Halgrimson | |
| 4,614,947 | A | | 9/1986 | Rammos | 343/778 |
| 4,689,631 | A | | 8/1987 | Gans et al. | 343/781 |
| 4,825,172 | A | | 4/1989 | Thompson | 330/124 R |
| 4,849,763 | A | | 7/1989 | DuFort | 342/372 |
| 4,890,110 | A | | 12/1989 | Kuwahara | 342/35 |
| 4,994,813 | A | | 2/1991 | Shiramatsu et al. | 342/360 |
| 5,034,752 | A | | 7/1991 | Pourailly et al. | 342/373 |
| 5,038,150 | A | * | 8/1991 | Bains | 342/373 |
| 5,061,939 | A | | 10/1991 | Nakase | 343/700 |
| 5,230,080 | A | | 7/1993 | Fabre et al. | 455/15 |
| 5,247,310 | A | | 9/1993 | Waters | 342/368 |
| 5,248,980 | A | | 9/1993 | Raguenet | 342/354 |
| 5,270,721 | A | | 12/1993 | Tsukamoto et al. | 343/700 |
| 5,280,297 | A | | 1/1994 | Profera, Jr. | 343/754 |
| 5,327,150 | A | | 7/1994 | Cherrette | 343/771 |
| 5,355,143 | A | | 10/1994 | Zurcher et al. | 343/700 |
| 5,379,455 | A | | 1/1995 | Koschek | 455/273 |
| 5,412,414 | A | | 5/1995 | Ast et al. | 342/174 |
| 5,457,557 | A | | 10/1995 | Zarem et al. | 359/121 |
| 5,513,176 | A | | 4/1996 | Dean et al. | 370/18 |
| 5,548,813 | A | | 8/1996 | Charas et al. | 455/33.3 |
| 5,554,865 | A | * | 9/1996 | Larson | 257/275 |
| 5,568,160 | A | | 10/1996 | Collins | 343/778 |
| 5,596,329 | A | | 1/1997 | Searle et al. | 342/374 |
| 5,604,462 | A | | 2/1997 | Gans et al. | 330/124 R |
| 5,610,510 | A | | 3/1997 | Boone et al. | 324/95 |
| 5,619,210 | A | | 4/1997 | Dent | 342/352 |
| 5,623,269 | A | * | 4/1997 | Hirshfeld et al. | 342/354 |
| 5,644,622 | A | | 7/1997 | Russell et al. | 455/422 |
| 5,646,631 | A | | 7/1997 | Arntz | 342/373 |
| 5,657,374 | A | * | 8/1997 | Russell et al. | 370/328 |
| 5,659,322 | A | | 8/1997 | Caille | 342/188 |
| 5,710,804 | A | | 1/1998 | Bhame et al. | 379/58 |
| 5,714,957 | A | | 2/1998 | Searle et al. | 342/374 |
| 5,724,666 | A | | 3/1998 | Dent | 455/562 |
| 5,751,250 | A | | 5/1998 | Arntz | 342/373 |
| 5,754,139 | A | | 5/1998 | Turcotte et al. | 342/373 |
| 5,758,287 | A | | 5/1998 | Lee et al. | 455/450 |
| 5,770,970 | A | | 6/1998 | Ikeda | 330/286 |
| 5,771,017 | A | | 6/1998 | Dean et al. | 342/374 |
| 5,802,173 | A | | 9/1998 | Hamilton-Piercy et al. | 379/56.2 |
| 5,809,395 | A | | 9/1998 | Hamilton-Piercy et al. | 455/4.1 |
| 5,832,389 | A | | 11/1998 | Dent | 455/562 |
| 5,854,611 | A | | 12/1998 | Gans et al. | 342/373 |
| 5,856,804 | A | | 1/1999 | Turcotte et al. | 342/371 |
| 5,862,459 | A | | 1/1999 | Charas | 455/114 |
| 5,878,345 | A | | 3/1999 | Ray et al. | 455/431 |
| 5,936,577 | A | | 8/1999 | Shoki et al. | 342/373 |
| 5,966,094 | A | | 10/1999 | Ward et al. | 342/373 |
| 5,987,335 | A | | 11/1999 | Knoedl, Jr. et al. | 455/561 |
| 6,008,763 | A | | 12/1999 | Nystrom et al. | 343/700 |
| 6,016,123 | A | | 1/2000 | Barton et al. | 342/373 |
| 6,018,643 | A | | 1/2000 | Golemon et al. | 455/63 |
| 6,037,903 | A | | 3/2000 | Lange et al. | 343/700 MS |
| 6,043,790 | A | | 3/2000 | Derneryd et al. | 343/853 |
| 6,072,434 | A | | 6/2000 | Papatheodorou | 343/700 |
| 6,091,360 | A | | 7/2000 | Reits | 342/368 |
| 6,094,165 | A | | 7/2000 | Smith | 342/373 |
| 6,104,935 | A | | 8/2000 | Smith et al. | 455/562 |
| 6,140,976 | A | | 10/2000 | Locke et al. | 343/853 |
| 6,144,652 | A | * | 11/2000 | Avidor et al. | 370/336 |
| 6,157,343 | A | | 12/2000 | Andersson et al. | 342/371 |
| 6,222,503 | B1 | | 4/2001 | Gietema et al. | 343/890 |
| 6,233,466 | B1 | | 5/2001 | Wong et al. | 455/562 |

OTHER PUBLICATIONS

Herd, J., "Modelling of Wideband Proximity Microstrip Array Elements," Electronic Letters, vol. 26, No. 16, Aug. 1990, pp. 1282–1284.

Hall, P.S., and Hall, C.M., "Coplanar Corporate Feed Effects in Microstrip Patch Array Design," Proc. IEEE, vol. 135, pt. H, Jun. 1988, pp. 180–186.

Zurcher, J.F., "The SSFIP: A Global Concept for High Performance Broadband Planar Antennas," Electronic Letters, vol. 24, No. 23, Nov. 1988, pp. 1433–1435.

Zurcher, J.F., and Gardiol, F., Broadband Patch Antennas, Artech House, 1995, pp. 45–60.

Song, H.J. and Bialkowski, M.E., "A Multilayer Microstrip Patch Antenna Subarray Design using CAD," Microwave Journal., Mar. 1997, pp. 22–34, 8 pages.

Song, H.J. and Bialkowski, M.E., "Ku–Band 16×16 Planar Array with Aperture–Coupled Microstrip–Patch Elements," IEEE Antennas and Propagation Magazine, vol. 40, No. 5, Oct. 1998, pp. 25–29.

* cited by examiner

TRANSMIT/RECEIVE DISTRIBUTED ANTENNA SYSTEMS

CROSS-REFERENCE TO RELATED APPLICATION

This is a continuation-in-part of prior U.S. application Ser. No. 09/299,850, filed Apr. 26, 1999, and entitled "Antenna Structure and Installation"

BACKGROUND OF THE INVENTION

This invention is directed to novel antenna structures and systems including an antenna array for both transmit (Tx) and receive (Rx) operations.

In communications equipment such as cellular and personal communications service (PCS), as well as multi-channel multi-point distribution systems (MMDS) and local multi-point distribution systems (LMDS) it has been conventional to receive and retransmit signals from users or subscribers utilizing antennas mounted at the tops of towers or other structures. Other communications systems such as wireless local loop (WLL), specialized mobile radio (SMR) and wireless local area network (WLAN) have signal transmission infrastructure for receiving and transmitting communications between system users or subscribers which may also utilize various forms of antennas and transceivers.

All of these communications systems require amplification of the signals being transmitted and received by the antennas. For this purpose, it has heretofore been the practice to use conventional linear power amplifiers, wherein the cost of providing the necessary amplification is typically between U.S. $100 and U.S. $300 per watt in 1998 U.S. dollars. In the case of communications systems employing towers or other structures, much of the infrastructure is often placed at the bottom of the tower or other structure with relatively long coaxial cables connecting with antenna elements mounted on the tower. The power losses experienced in the cables may necessitate some increase in the power amplification which is typically provided at the ground level infrastructure or base station, thus further increasing expense at the foregoing typical costs per unit or cost per watt.

Moreover, conventional power amplification systems of this type generally require considerable additional circuitry to achieve linearity or linear performance of the communications system. For example, in a conventional linear amplifier system, the linearity of the total system may be enhanced by adding feedback circuits and pre-distortion circuitry to compensate for the nonlinearities at the amplifier chip level, to increase the effective linearity of the amplifier system. As systems are driven to higher power levels, relatively complex circuitry must be devised and implemented to compensate for decreasing linearity as the output power increases.

Output power levels for infrastructure (base station) applications in many of the foregoing communications systems is typically in excess of ten watts, and often up to hundreds of watts which results in a relatively high effective isotropic power requirement (EIRP). For example, for a typical base station with a twenty watt power output (at ground level), the power delivered to the antenna, minus cable losses, is around ten watts. In this case, half of the power has been consumed in cable loss/heat. Such systems require complex linear amplifier components cascaded into high power circuits to achieve the required linearity at the higher output power. Typically, for such high power systems or amplifiers, additional high power combiners must be used.

All of this additional circuitry to achieve linearity of the overall system, which is required for relatively high output power systems, results in the aforementioned cost per unit/watt (between $100 and $300).

The present invention proposes distributing the power across multiple antenna (array) elements, to achieve a lower power level per antenna element and utilize power amplifier technology at a much lower cost level (per unit/per watt).

SUMMARY OF THE INVENTION

In accordance with one aspect of the invention a distributed antenna device comprises a plurality of transmit antenna elements, a plurality of receive antenna elements and a plurality of power amplifiers, one of said power amplifiers being operatively coupled with each of said transmit antenna elements and mounted closely adjacent to the associated transmit antenna element, such that no appreciable power loss occurs between the power amplifier and the associated antenna element, at least one of said power amplifiers comprising a low noise amplifier and being built into said distributed antenna device for receiving and amplifying signals from at least on of said receive antenna elements, each said power amplifier comprising a relatively low power, relatively low cost per watt linear power amplifier chip.

DETAILED DESCRIPTION OF THE ILLUSTRATED EMBODIMENT

Figure 1:
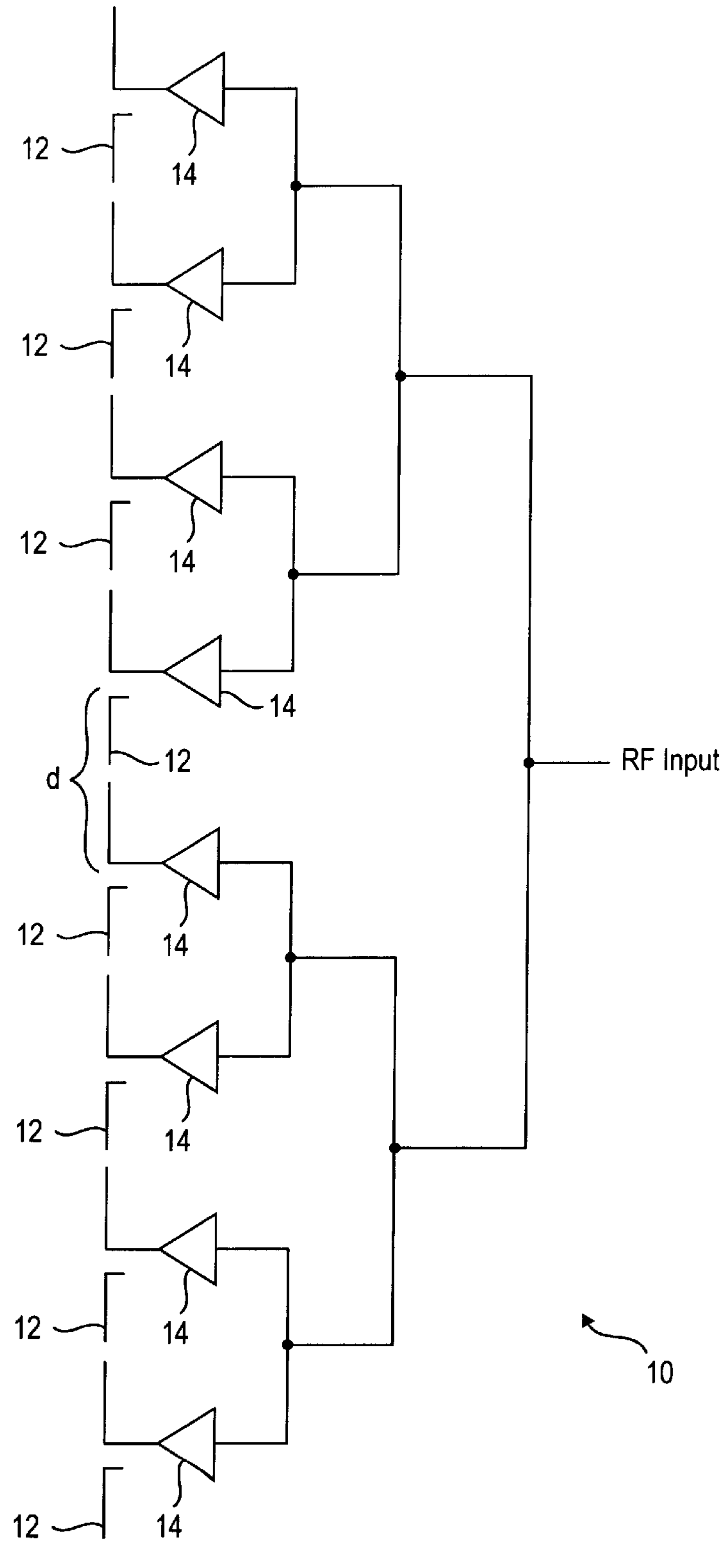
FIG. 1 is a simplified schematic of a transmit antenna array utilizing power amplifier chips/modules.
Figure 2:
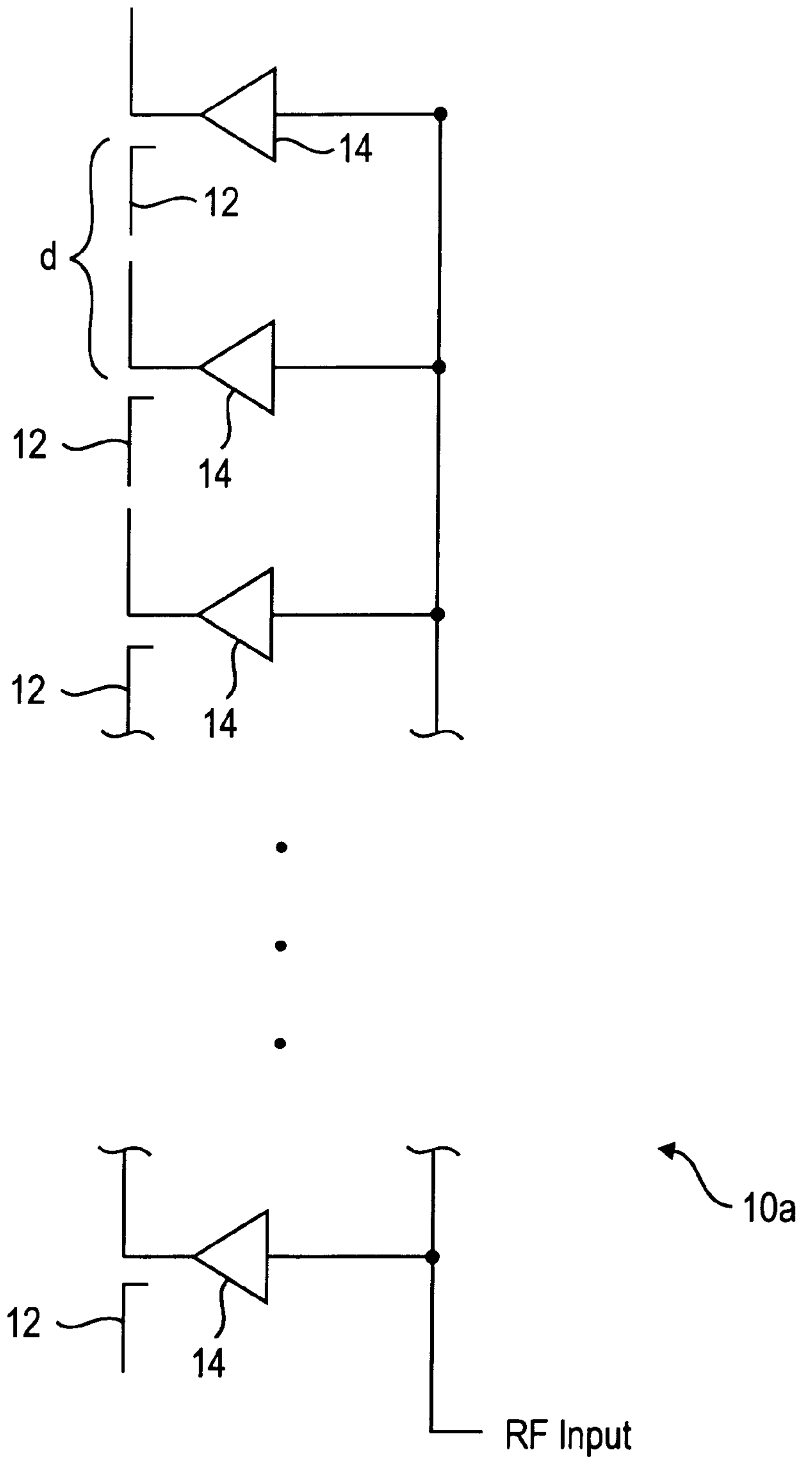
FIG. 2 is a schematic similar to FIG. 1 in showing an alternate embodiment.

Referring now to the drawings, and initially to FIGS. 1 and 2, there are shown two examples of a multiple antenna element antenna array 10, 10*a* in accordance with the invention. The antenna array 10, 10*a* of FIGS. 1 and 2 differ in the configuration of the feed structure utilized, FIG. 1 illustrating a parallel corporate feed structure and FIG. 2 illustrating a series corporate feed structure. In other respects, the two antenna arrays 10, 10*a* are substantially identical. Each of the arrays 10, 10*a* includes a plurality of antenna elements 12, which may comprise monopole, dipole or microstrip/patch antenna elements. Other types of antenna elements may be utilized to form the arrays 10, 10*a* without departing from the invention.

In accordance with one aspect of the invention, an amplifier element 14 is operatively coupled to the feed of each antenna element 12 and is mounted in close proximity to the associated antenna element 12. In one embodiment, the amplifier elements 14 are mounted sufficiently close to each antenna element so that no appreciable losses will occur between the amplifier output and the input of the antenna element, as might be the case if the amplifiers were coupled to the antenna elements by a length of cable or the like. For example, the power amplifiers 14 may be located at the feed point of each antenna element. In one embodiment, the amplifier elements 14 comprise relatively low power, linear integrated circuit chip components, such as monolithic microwave integrated circuit (MMIC) chips. These chips may comprise chips made by the gallium arsenide (GaAs) heterojunction transistor manufacturing process. However, silicon process manufacturing or CMOS process manufacturing might also be utilized to form these chips.

Some examples of MMIC power amplifier chips are as follows:

1. RF Microdevices PCS linear power amplifier RF 2125P, RF 2125, RF 2126 or RF 2146, RF Micro Devices, Inc., 7625 Thorndike Road, Greensboro, N.C. 27409, or 7341-D W. Friendly Ave., Greensboro, N.C. 27410;
2. Pacific Monolithics PM 2112 single supply RF IC power amplifier, Pacific Monolithics, Inc., 1308 Moffett Park Drive, Sunnyvale, Calif.;
3. Siemens CGY191, CGY180 or CGY181, GaAs MMIC dual mode power amplifier, Siemens AG, 1301 Avenue of the Americas, New York, N.Y.;
4. Stanford Microdevices SMM-208, SMM-210 or SXT-124, Stanford Microdevices, 522 Almanor Avenue, Sunnyvale, Calif.;
5. Motorola MRFIC1817 or MRFIC1818, Motorola Inc., 505 Barton Springs Road, Austin, Tex.;
6. Hewlett Packard HPMX-3003, Hewlett Packard Inc., 933 East Campbell Road, Richardson, Tex.;
7. Anadigics AWT1922, Anadigics, 35 Technology Drive, Warren, N.J. 07059;
8. SEI P0501913H, SEI Ltd., 1, Taya-cho, Sakae-ku, Yokohama, Japan; and
9. Celeritek CFK2062-P3, CCS1930 or CFK2162-P3, Celeritek, 3236 Scott Blvd., Santa Clara, Calif. 95054.

In the antenna arrays of FIGS. 1 and 2, array phasing may be adjusted by selecting or specifying the element-to-element spacing (d) and/or varying the line length in the corporate feed. The array amplitude coefficient adjustment may be accomplished through the use of attenuators before or after the power amplifiers 14, as shown in FIG. 3.

Figure 3:
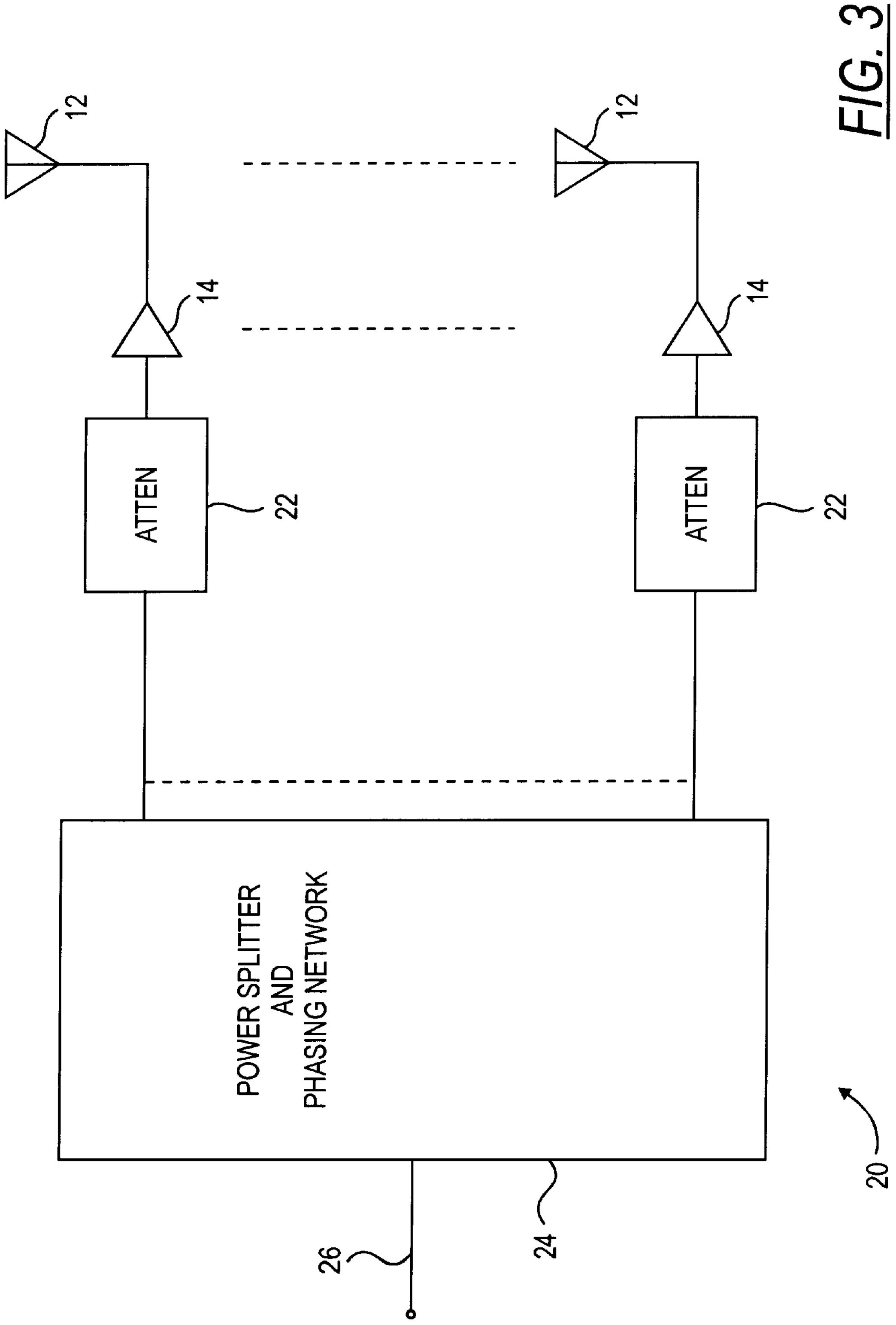
FIG. 3 is a block diagram of an antenna assembly or system.

Referring now to FIG. 3, an antenna system in accordance with the invention and utilizing an antenna array of the type shown in either FIG. 1 or FIG. 2 is designated generally by the reference numeral 20. The antenna system 20 includes a plurality of antenna elements 12 and associated power amplifier chips 14 as described above in connection with FIGS. 1 and 2. Also operatively coupled in series circuit with the power amplifiers 14 are suitable attenuator circuits 22. The attenuator circuits 22 may be interposed either before or after the power amplifier 14; however, FIG. 3 illustrates them at the input to each power amplifier 14. A power splitter and phasing network 24 feeds all of the power amplifiers 14 and their associated series connected attenuator circuits 22. An RF input 26 feeds into this power splitter and phasing network 24.

Referring now to the remaining FIGS. 4–11, the various embodiments of the invention shown have a number of characteristics, three of which are summarized below:

1) Use of two different patch elements; one transmit, and one receive. This results in substantial RF signal isolation (over 20 dB isolation, at PCS frequencies, by simply separating the patches horizontally by 4 inches) without requiring the use of a frequency diplexer at each antenna element (patch). This technique can be used on virtually any type of antenna element (dipole, monopole, microstrip/patch, etc.).

Figure 4:
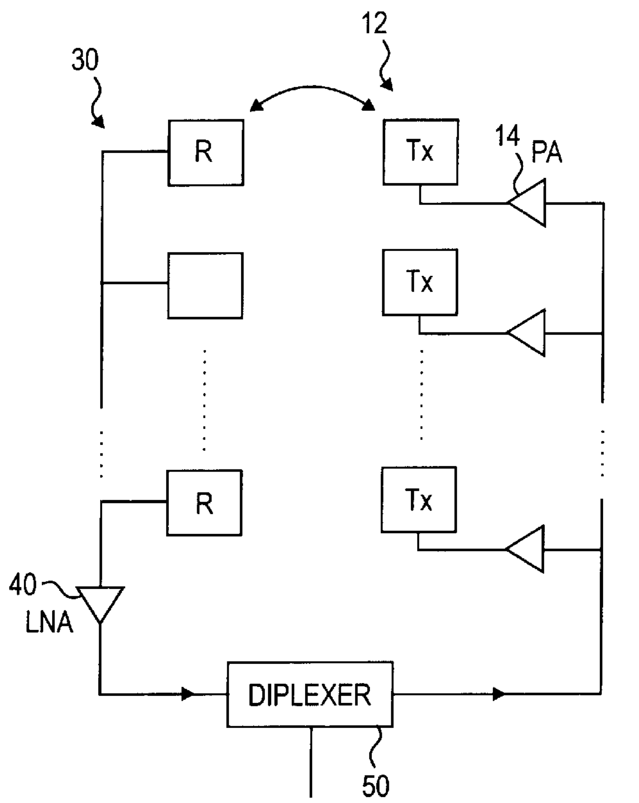
FIG. 4 is a block diagram of a transmit/receive antenna system in accordance with one form of the invention.
Figure 5:
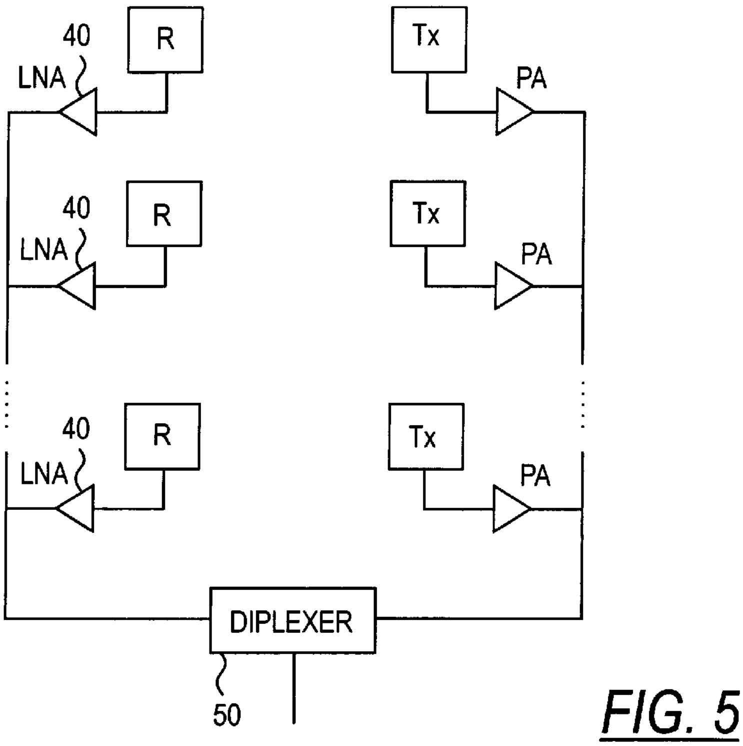
FIG. 5 is a block diagram of a transmit/receive antenna system in accordance with another form of the invention.
Figure 6:
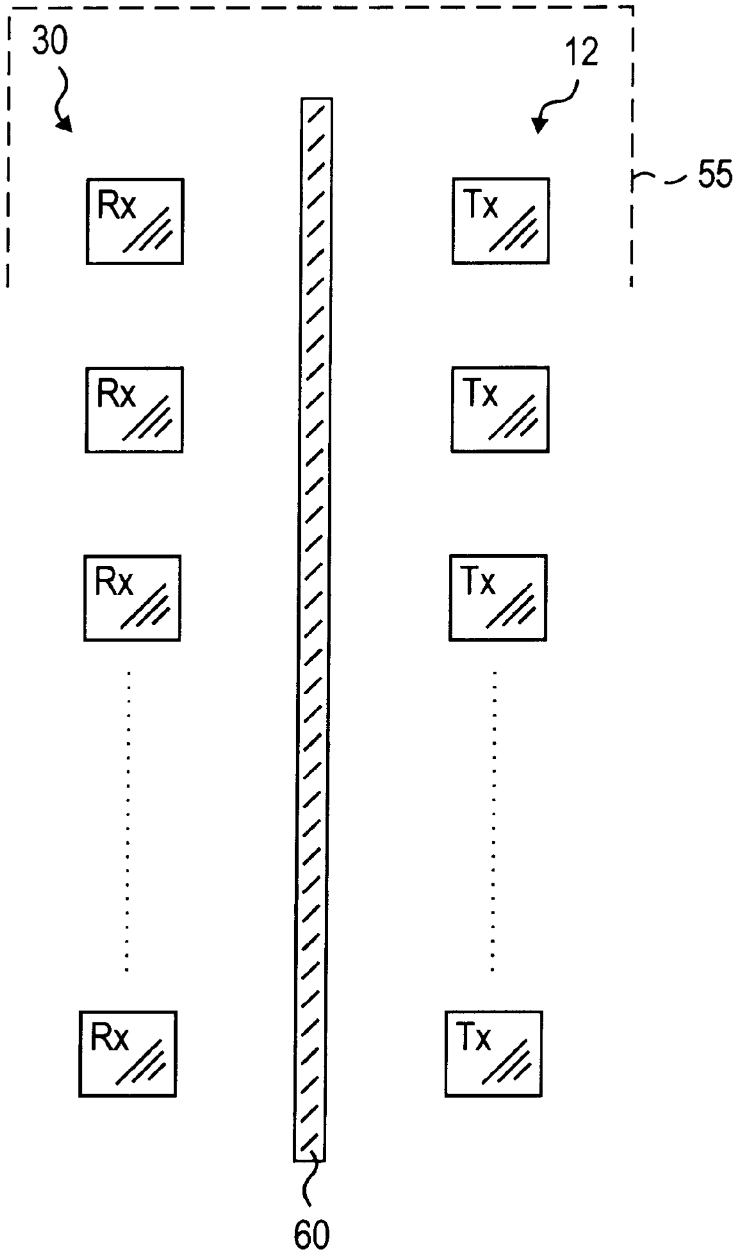
FIG. 6 is a block diagram of a transmit/receive antenna system including a center strip in accordance with another form of the invention.

In some embodiments of a distributed antenna system, we use a collection of elements (M vertical Tx elements 12, and M vertical Rx elements 30), as shown in FIGS. 4, 5 and 6. FIGS. 4 and 5 show the elements in a series corporate feed structure, for both the Tx and Rx. Note, that they can also be in a parallel corporate feed structure (not shown); or the Tx in a parallel corporate feed structure, and receive elements in a series feed structure (or vice-versa).

2) Use of a “built in” Low Noise Amplifier (LNA) circuit or device; that is, built directly into the antenna, for the receive (Rx) side. FIG. 4 shows the LNA 40 after the antenna elements 30 are summed via the series (or parallel) corporate feed structure. FIG. 5 shows the LNA devices 40 (discrete devices) at the output of each Rx element (patch), before being RF summed.

The LNA device 40 at the Rx antenna reduces the overall system noise figure (NF), and increases the sensitivity of the system, to the signal emitted by the remote radio. This therefore, helps to increase the range of the receive link (uplink).

The similar use of power amplifier devices 14 (chips) at the transmit (Tx) elements has been discussed above.

3) Use of a low power frequency diplexer 50 (shown in FIGS. 4 and 5). In conventional tower top systems (such as “Cell Boosters”), since the power delivered to the antenna (at the input) is high power RF, a high power frequency diplexer must be used (within the Cell Booster, at the tower top). In our system, since the RF power delivered to the (Tx) antenna is low (typically less than 100 milliwatts), a low power diplexer 50 can be used.

Additionally, in conventional system, the diplexer isolation is typically required to be well over 60 dB; often up to 80 or 90 dB isolation between the uplink and downlink signals.

Since the power output from our system, at each patch, is low power (less than 1–2 Watts typical), and since we have already achieved (spatial) isolation via separating the patches, the isolation requirements of our diplexer is much less.

In each of the embodiments illustrated herein, a final transmit rejection filter (not shown) would be used in the receive path. This filter might be built into the or each LNA if desired; or might be coupled in circuit ahead of the or each LNA.

Referring now to FIG. 6, this embodiment uses two separate antenna elements (arrays), one for transmit 12, and one for receive 30, e.g., a plurality of transmit (array) elements 12, and a plurality of receive (array) elements 30. The elements can be dipoles, monopoles, microstrip (patch)

elements, or any other radiating antenna element. The transmit element (array) will use a separate corporate feed (not shown) from the receive element array. Each array (transmit 30 and receive 12) is shown in a separate vertical column; to shape narrow elevation beams. This can also be done in the same manner for two horizontal rows of arrays (not shown); shaping narrow azimuth beams.

Separation (spatial) of the elements in this fashion increases the isolation between the transmit and receive antenna bands. This acts similarly to the use of a frequency diplexer coupled to a single transmit/receive element. Separation by over half a is wavelength typically assures isolation greater than 10 dB.

The backplane/reflector 55 can be a flat ground plane, a piecewise or segmented linear folded ground plane, or a curved reflector panel (for dipoles). In either case, one or more conductive strips 60 (parasitic) such as a piece of metal can be placed on the backplane to assure that the transmit and receive element radiation patterns are symmetrical with each other, in the azimuth plane; or in the plane orthogonal to the arrays. FIG. 6 illustrates an embodiment where a single center strip 60 is used for this purpose and is described below. However, multiple strips could also be utilized, for example over more strips to either side of the respective Tx and Rx antenna element(s). This can also be done for antenna elements (Tx, Rx) oriented in a horizontal array (not shown); i.e., assuring symmetry in the elevation plane. For antenna elements (Tx, Rx) which are non-centered on the ground plane 55, as shown in FIG. 6, the resulting radiation patterns are typically non-symmetric; that is, the beams tend to skew away from the azimuth center point. The center strip 60 (metal) "pulls" the radiation pattern beam, for each array, back towards the center. This strip 60 can be a solid metal (aluminum, 30 copper, . . . ) bar; in the case of dipole antenna elements, or a simple copper strip in the case of microstrip/patch antenna elements. In either case, the center strip 60 can be connected to ground or floating; i.e., not connected to ground. Additionally, the center strip 60 (or bar) further increases the isolation between the transmit and receive antenna arrays/elements.

The respective Tx and Rx antenna elements can be orthogonally polarized relative to each other to achieve even further isolation. This can be done by having the receive elements 30 in a horizontal polarization, and the transmit elements 14 in a vertical polarization, or vice-versa. Similarly, this can be accomplished by operating the receive elements 30 in slant-45 degree (right) polarization, and the transmit elements 14 in slant-45 degree (left) polarization, or vice-versa.

Vertical separation of the elements 14 in the transmit array is chosen to achieve the desired beam pattern, and in consideration of the amount of mutual coupling that can be tolerated between the elements 14 (in the transmit array). The receive elements 30 are vertically spaced by similar considerations. The receive elements 30 can be vertically spaced differently from the transmit elements 14; however, the corporate feed(s) must be compensated to assure a similar receive beam pattern to the transmit beam pattern, across the desired frequency band(s). The phasing of the receive corporate feed usually will be slightly compensated to assure a similar pattern to the transmit array.

Most existing Cellular/PCS antennas use the same antenna element or array for both transmit and receive. The typical arrangement has a RF cable going to the antenna, which uses a parallel corporate feed structure; thus all the feed paths, and the elements, handle both the transmit and receive signals. Thus, for these types of systems, there isn't a need to separate the elements into separate transmit and receive functionalities. The characteristics of this approach are:

a) A single (1) antenna element (or array) used; for both Tx and Rx operation.

b) No constriction or restriction on geometrical configuration.

c) One (1) single corporate feed structure, for both Tx and Rx operation.

d) Element is polarized in the same plane for both Tx and Rx.

For (c) and (d), there are some cases (i.e. dual polarized antennas) that use cross-polarized antennas (literally two antenna structures, or sub-elements, within the same element), with the Tx functionality with its own sub-element and corporate feed structure, and the Rx functionality with its own sub-element and separate corporate feed structure.

In FIG. 6, we split up the transmit and receive functionalities into separate transmit and receive antenna elements, so as to allow separation of the distinct bands (transmit and receive). This provides added isolation between the bands, which in the case of the receive path, helps to attenuate (reduce the power level of the signals in the transmit band), prior to amplification. Similarly, for the transmit paths, we only (power) amplify the transmit signals using the active components (power amplifiers) prior to feeding the amplified signal to the transmit antenna elements.

As mentioned above, the center strip aids in correcting the beams from steering outwards. In a single column array, where the same elements are used for transmit and receive, the array would likely be placed in the center of the antenna (ground plane) (see e.g., FIG. 7, described below). Thus the azimuth beam would be centered (symmetric) orthogonal to the ground plane. However, by using adjacent vertical arrays (one for Tx and one for Rx), the beams become asymmetric and steer outwards by a few degrees. Placement of a parasitic center strip between the two arrays "pulls" each beam back towards the center. Of course, this can be modeled to determine the correct strip width and placement (s) and locations of the vertical arrays, to accurately center each beam.

The characteristics of this approach are:

a) Two (2) different antenna elements (or arrays) used; one for Tx and one for Rx.

b) Geometrical configuration is spaced apart, adjacent placement of Tx and Rx elements (as shown in FIG. 6).

c) Two (2) separate corporate feed structures used, one for Tx and one for Rx.

d) Each element can be polarized in the same plane, or an arrangement can be constructed where the Tx element (s) are in a given polarization, and the Rx elements are all in an orthogonal polarization.

Figure 7:
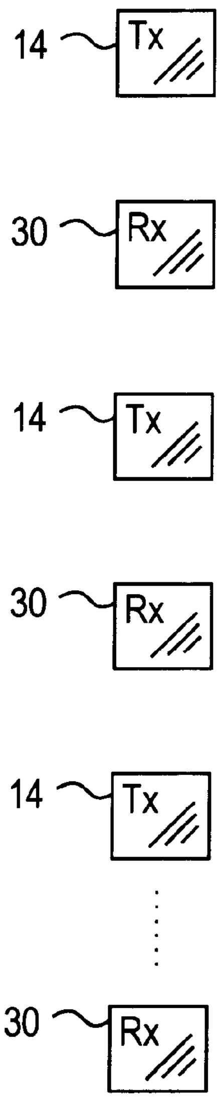
FIG. 7 is a block diagram of an antenna system employing transmit and receive elements in a linear array in accordance with another aspect of the invention.

The embodiment of FIG. 7 uses two separate antenna elements, one for transmit 14, and one for receive 30, or a plurality of transmit (array) elements, and a plurality of receive (array) elements. The elements can be dipoles, monopoles, microstrip (patch) elements, or any other radiating antenna element. The transmit element array will use a separate corporate feed from the receive element array. However, all elements are in a single vertical column; for beam shaping in the elevation plane. This arrangement can also be used in a single horizontal row (not shown), for beam shaping in the azimuth array. This method assures highly symmetric (centered) beams, in the azimuth plane, for a column (of elements); and in the elevation plane, for a row (of elements).

The individual Tx and Rx antenna elements in FIG. 7, can be orthogonally polarized to each other to achieve even further isolation. This can be done by having the receive patches 30 (or elements, in the receive array) in the horizontal polarization, and the transmit patches 14 (or elements) in the vertical polarization, or vice-versa. Similarly, this can be accomplished by operating the receive elements in slant-45 degree (right) polarization, and the transmit elements in slant-45 degree (left) polarization, or vice-versa.

This technique allows placing the all elements down a single center line. This results in symmetric (centered) azimuth beams, and reduces the required width of the antenna. However, it also increases the mutual coupling between antenna elements, since they should be packed close together, so as to not create ambiguous elevation lobes.

The characteristics of this approach are:

a) Two (2) different antenna elements (or arrays) used; one for Tx and one for Rx.

b) Geometrical configuration is adjacent, collinear placement.

c) Two (2) separate corporate feed structures used, one for Tx and one for Rx.

d) Each element is polarized in the same plane, or the Tx element(s) are all in a given polarization, and the Rx elements are all in an orthogonal polarization.

Figure 8:
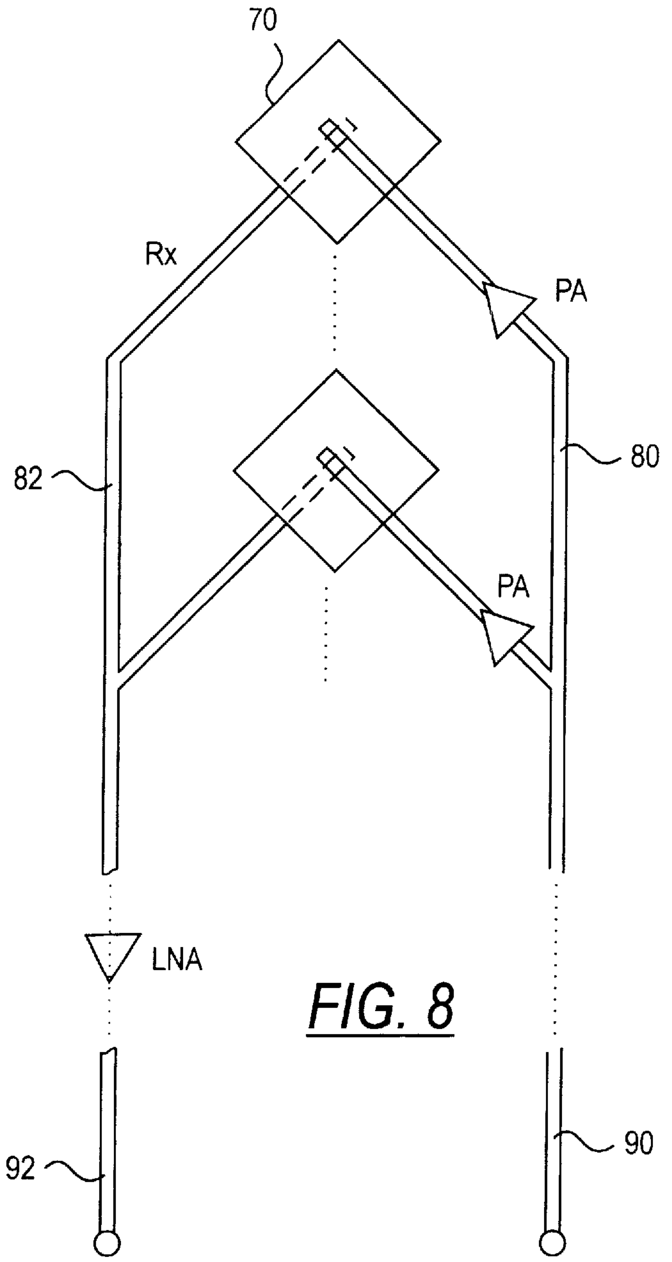
FIG. 8 is a block diagram of an antenna system employing antenna array elements in a layered configuration with microstrip feedlines for respective transmit and receive functions oriented in orthogonal directions to each other.

The embodiment of FIG. 8 uses a single antenna element (or array), for both the transmit and receive functions. In this case, a patch (microstrip) antenna element is used. The patch element 70 is created via the use of a multi-element (4-layer) printed circuit board, with dielectric layers 72, 74, 76 (see FIG. 8*a*). The antennas can be fed with either a coaxial probe (not shown), or aperture coupled probes or microstriplines 80, 82. For the receive function, the feed microstripline 82 is oriented orthogonal to the feed stripline (probe) 80 for the transmit function.

The elements can be cascaded, in an array, as shown in FIG. 8, for beam shaping purposes. The RF input 90 is directed towards the radiation elements via a separate corporate feed from the RF output 92 (on the receive corporate feed), ending at point "A". Note that either or both corporate feeds 80, 82 can be parallel or series corporate feed structures.

The diagram of FIG. 8 shows that the receive path RF is summed in a series corporate feed, ending at point "A" (92) preceded by a low noise amplifier (LNA). However, low noise amplifiers, (LNAs), can be used directly at the output of each of the receive feeds (not shown in FIG. 8), prior to summing, similar to the showing in FIG. 4, as discussed above.

Figure 9:
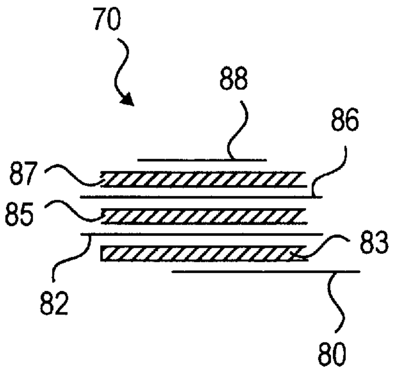
FIG. 9 is a partial sectional view through a multi-layered antenna element which may be used in the arrangement of FIG. 8.

The transmit and receive RF isolation is achieved via orthogonal polarization taps from the same antenna (patch) element, as shown and described above with reference to FIGS. 8 and 9. FIG. 9 indicates, in cross-section, the general layered configuration of each element 70 of FIG. 8. The respective feeds 80, 82 are separated by a dielectric layer 83. Another dielectric layer 85 separates the feed 82 from a ground plane 86, while yet a further dielectric layer separates the ground plane 86 from a radiating element or "patch" 88.

This concept uses the same antenna physical location for both functionalities (Tx and Rx). A single patch element (or cross polarized dipole) can be used as the antenna element, with two distinct feeds (one for Tx, and the other for Rx at orthogonal polarization). The two antenna elements (Tx and Rx) are orthogonally polarized, since they occupy the same physical space.

The characteristics of this approach are:

a) One (1) single antenna element (or array), used for both Tx and Rx.

b) No construct on geometrical configuration.

c) Two (2) separate corporate feed structures used, one for Tx and one for Rx.

d) Each element contains two (2) sub-elements, cross polarized (orthogonal) to one another.

Figure 10:
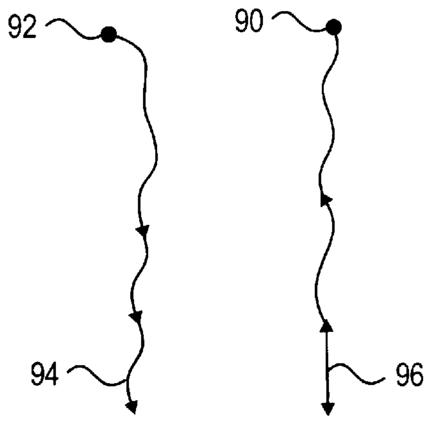
FIGS. 10 and 11 show various configurations of directing input and output RF from a transmit/receive antenna such as the antenna of FIGS. 8 and 9.
Figure 11:
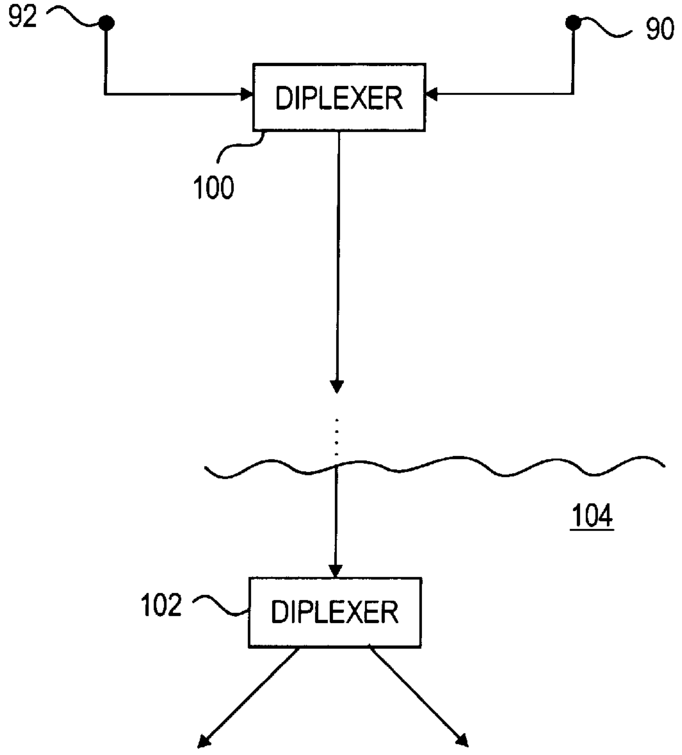

The embodiments of FIGS. 10–11 show two (2) ways to direct the input and output RF from the Tx/Rx active antenna, to the base station.

FIG. 10 shows the output RF energy, at point 92 (of FIG. 8), and the input RF energy, going to point 90 (of FIG. 8), as two distinctly different cables 94, 96. These cables can be coaxial cables, or fiber optic cables (with RF/analog to fiber converters, at points "A" and "B"). This arrangement does not require a frequency diplexer at the antenna (tower top) system. Additionally, it does not require a frequency diplexer (used to separate the transmit band and receive band RF energies) at the base station.

FIG. 11 shows the case where the output RF energy (from the receive array) and the input RF energy (going to the transmit array), are diplexed together (via a frequency diplexer 100), within the antenna system so that a single cable 98 runs down the tower (not shown) to the base station 104. Thus, the output/input to the base station 104 is via a single coaxial cable (or fiber optic cable, with RF/analog to fiber optic converter). This system requires another frequency diplexer 102 at the base station 104.

Figure 12:
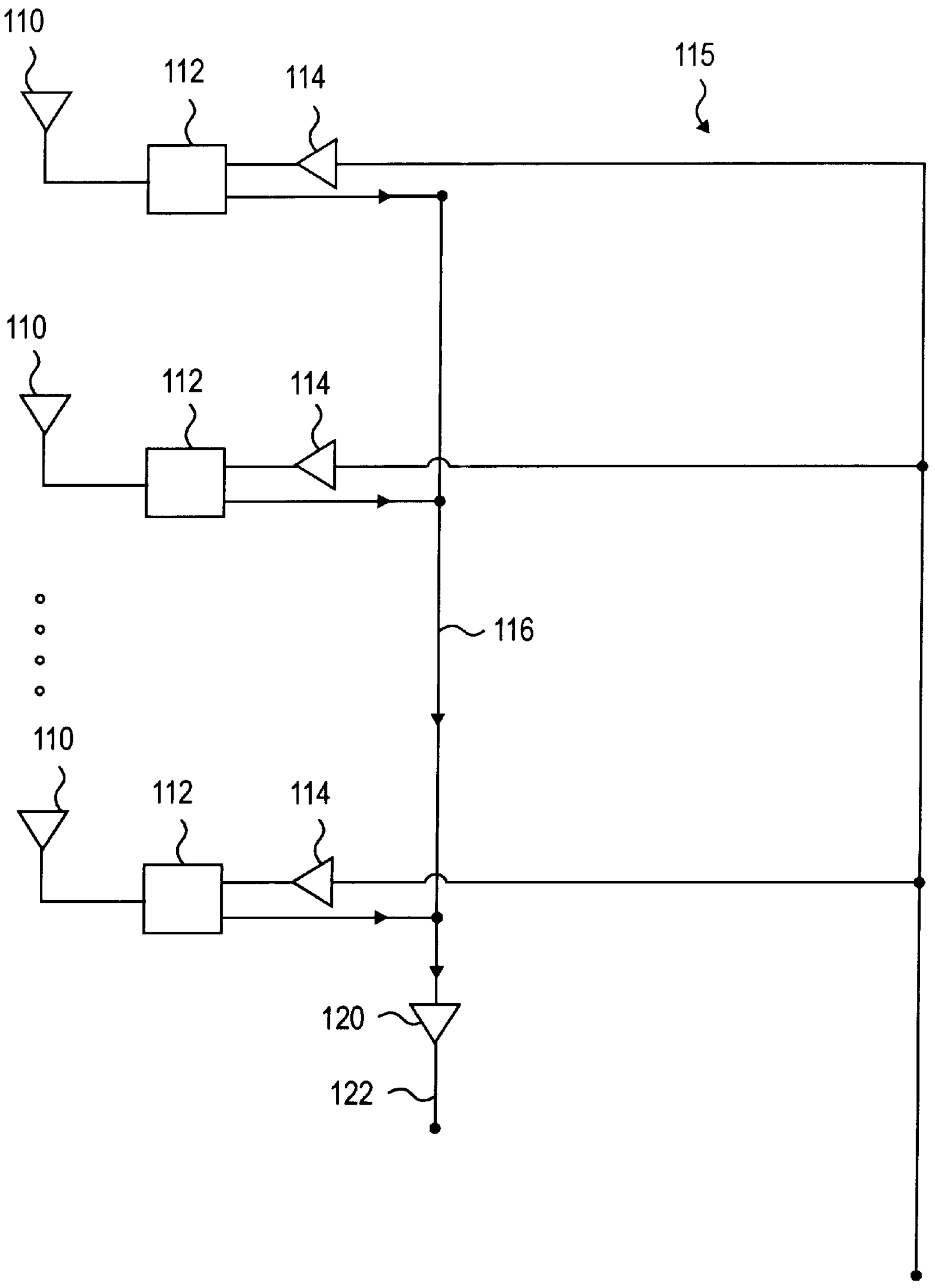
FIGS. 12 and 13 are block diagrams showing two embodiments of a transmit/receive active antenna system with respective alternative arrangements of diplexers and power amplifiers.
Figure 13:
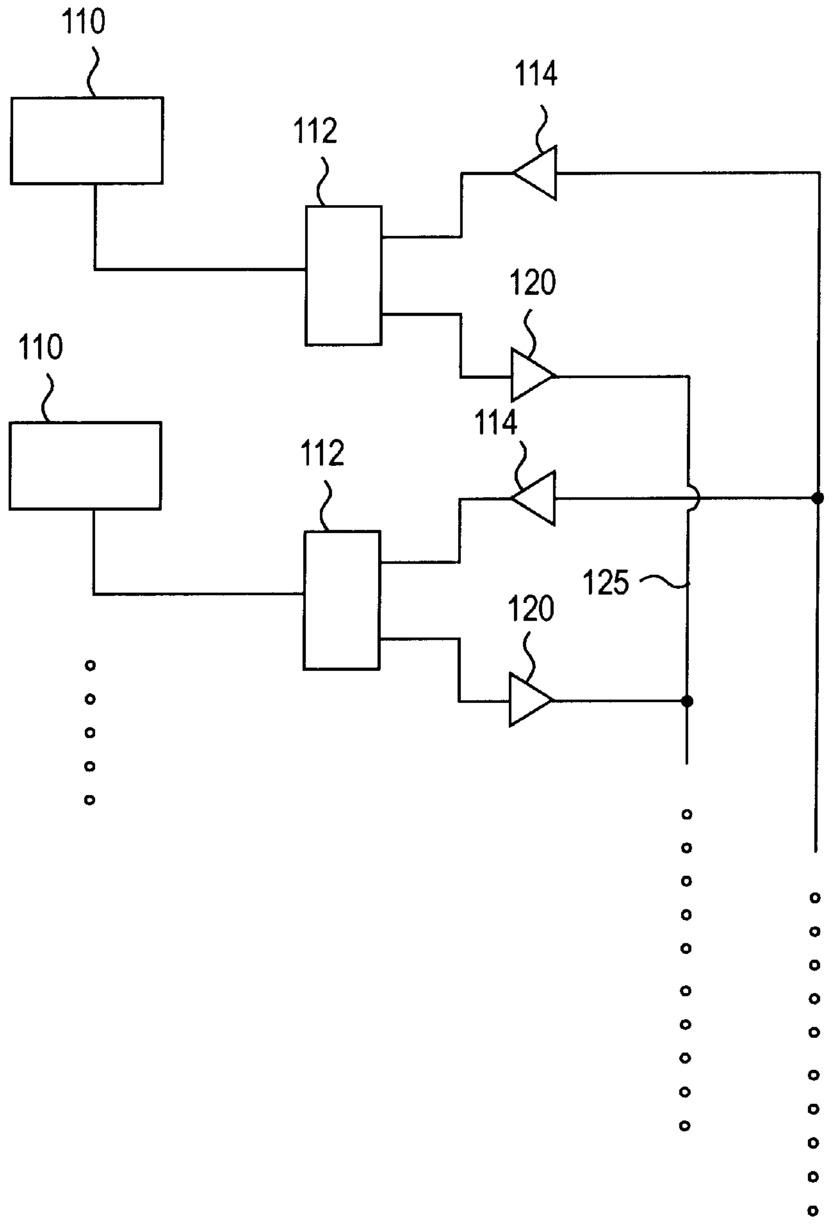

FIGS. 12 and 13 show another arrangement which may be used as a transmit/receive active antenna system. The array comprises of a plurality of antenna elements 110 (dipoles, monopoles, microstrip patches, . . . ) with a frequency diplexer 112 attached directly to the antenna element feed of each element.

In FIG. 12, the RF input energy (transmit mode) is split and directed to each element, via a series corporate feed structure 115 (this can be microstrip, stripline, or coaxial cable), but can also be a parallel corporate feed structure (not shown). Prior to each diplexer 112, is a power amplifier (PA) chip or module 114. The RF output (receive mode) is summed in a separate corporate feed structure 116, which is amplified by a single LNA 120, prior to point "A," the RF output 122.

In FIG. 13, there is an LNA 120 at the output of each diplexer 112, for each antenna (array) element 110. Each of these are then summed in the corporate feed 125 (series or parallel), and directed to point "A," the RF output 122.

The arrangements of FIGS. 12 and 13 can employ either of the two connections (described in FIGS. 10 and 11), for connection to the base station 104 (transceiver equipment).

What has been shown and described herein is a novel antenna array employing power amplifier chips or modules at the feed of individual array antenna elements, and novel installations utilizing such an antenna system.

While particular embodiments and applications of the present invention have been illustrated and described, it is to be understood that the invention is not limited to the precise construction and compositions disclosed herein and that various modifications, changes, and variations may be apparent from the foregoing descriptions, and are to be understood as forming a part of the invention insofar as they fall within the spirit and scope of the invention as defined in the appended claims.

What is claimed is:

1. A distributed antenna device comprising:

a plurality of transmit antenna elements;

a plurality of receive antenna elements; and a plurality of power amplifiers, a power amplifier being operatively coupled with each of said transmit antenna elements and mounted closely adjacent to the associated transmit antenna element, such that no appreciable power loss occurs between the power amplifier and the associated antenna element;

at least one low noise amplifier for receiving and amplifying signals from at least one of said receive antenna elements;

each said power amplifier comprising a relatively low power, relatively low cost per watt linear power amplifier;

said device being configured such that said transmit antenna elements and said power amplifiers coupled thereto, and said receive antenna elements and said at least one low noise amplifier coupled thereto are continuously active and capable of simultaneous respective transmit and receive operations;

wherein said receive antenna elements are in a first linear array and said transmit antenna elements are in a second linear array spaced apart from and parallel to said first linear array; and further including an electrically conductive center strip element positioned between the first and second linear arrays.

2. The antenna device of claim 1 wherein said receive antenna elements, said transmit antenna elements and said center strip element are all mounted to a common backplane.

3. The antenna device of claim 2 wherein all of said power amplifiers are also mounted to said backplane.

4. A distributed antenna device comprising:

a plurality of transmit antenna elements, a plurality of receive antenna elements; and a plurality of power amplifiers, a power amplifier being operatively coupled with each of said transmit antenna elements and mounted closely adjacent to the associated transmit antenna element, such that no appreciable power loss occurs between the power amplifier and the associated antenna element; and at least one low noise amplifier for receiving and amplifying signals from at least one of said receive antenna elements;

each said power amplifier comprising a relatively low power, relatively low cost per watt linear power amplifier; and said device being configured such that said transmit antenna elements and said power amplifiers coupled thereto, and said receive antenna elements and said at least one low noise amplifier coupled thereto are continuously active and capable of simultaneous respective transmit and receive operations;

wherein said transmit antenna elements and said receive antenna elements are arranged in a single linear array in alternating order.

5. The distributed antenna device of claim 4 wherein said transmit antenna elements are polarized in one polarization and the receive antenna elements are polarized orthogonally to the polarization of said transmit antenna elements.

6. The antenna device of claim 4 wherein said transmit antenna elements are coupled to a one of a series and a parallel corporate feed structure and said receive antenna elements are coupled to a one of a series and a parallel corporate feed structures.

7. A distributed antenna device comprising:

a plurality of transmit antenna elements;

a plurality of receive antenna elements; and a plurality of power amplifiers, a power amplifier being operatively coupled with each of said transmit antenna elements and mounted closely adjacent to the associated transmit antenna element, such that no appreciable power loss occurs between the power amplifier and the associated antenna element; and at least one low noise amplifier for receiving and amplifying signals from at least one of said receive antenna elements;

each said power amplifier comprising a relatively low power, relatively low cost per watt linear power amplifier; and said device being configured such that said transmit antenna elements and said power amplifiers coupled thereto, and said receive antenna elements and said at least one low noise amplifier coupled thereto are continuously active and capable of simultaneous respective transmit and receive operations;

wherein a single array of patch antenna elements functions as both said transmit antenna elements and said receive antenna elements, and further including a transmit feed stripline and a receive feed stripline aperture-coupled to each of said patch antenna elements, said transmit feed stripline and said receive feed stripline being oriented orthogonally to each other at least in a region where they are coupled with each said patch element.

8. The antenna device of claim 7 wherein a single transmit RF cable is coupled to all of said power amplifiers to carry signals to be transmitted to said antenna device and a single receive RF cable is coupled to said at least one low noise amplifier to carry received signals away from said antenna device.

9. The antenna device of claim 7 and further including a low power frequency diplexer operatively coupled with all of said power amplifiers and with said at least one low noise amplifier for coupling a single RF cable to all of said transmit and receive antenna elements.

10. The antenna device of claim 7 and further including a frequency diplexer operatively coupled with each said patch antenna element, said plurality of power amplifiers and said at least one low noise amplifier being coupled in circuit with said frequency diplexer.

11. The antenna device of claim 10 wherein each said frequency diplexer has a receive output and wherein a single low noise amplifier is coupled to a summed junction of said receive outputs.

12. The antenna device of claim 10 wherein each of said frequency diplexers has a receive output, and wherein said at least one low noise amplifier includes a low noise amplifier coupled to each of said receive outputs.

13. The antenna device of claim 10 wherein said transmit antenna elements are coupled to a one of a series and a parallel corporate feed structure and said receive antenna elements are coupled to a one of a series and a parallel corporate feed structure.

14. A method of operating a distributed antenna comprising:

arranging a plurality of transmit antenna elements in an array;

arranging a plurality of receive antenna elements in an array;

coupling a power amplifier with each of said transmit antenna elements mounted closely adjacent to the associated transmit antenna element, such that no appreciable power loss occurs between the power amplifier and the associated antenna element;

providing at least one low noise amplifier built into said distributed antenna for receiving and amplifying signals from at least one of said receive antenna elements;

simultaneously transmitting from said transmit antenna elements and receiving from said receive antenna elements;

arranging said receive antenna elements in a first linear array and arranging said transmit antenna elements in a second linear array spaced apart from and parallel to said first linear array; and positioning an electrically conductive center strip element between the first and second linear arrays.

15. The method of claim 14 further including mounting said receive antenna elements, said transmit antenna elements and said center strip element to a common backplane.

16. The method of claim 15 further including mounting all of said power amplifiers and said at least one low noise amplifier to said backplane.

17. A method of operating a distributed antenna comprising:

arranging a plurality of transmit antenna elements in an array;

arranging a plurality of receive antenna elements in an array;

coupling a power amplifier with each of said transmit antenna elements mounted closely adjacent to the associated transmit antenna element, such that no appreciable power loss occurs between the power amplifier and the associated antenna element;

providing at least one low noise amplifier built into said distributed antenna for receiving and amplifying signals from at least one of said receive antenna elements;

simultaneously transmitting from said transmit antenna elements and receiving from said receive antenna elements; and further including arranging said transmit antenna elements and said receive antenna elements in a single linear array in alternating order.

18. The method of claim 17 and further including polarizing said transmit antenna elements in one polarization and polarizing the receive antenna elements orthogonally to the polarization of said transmit antenna elements.

19. An antenna system installation comprising a tower/support structure, and an antenna structure mounted on said tower/support structure, said antenna structure comprising:

a plurality of antenna elements;

a plurality of power amplifiers, each power amplifier being operatively coupled with one of said antenna elements and mounted closely adjacent to the associated antenna element, such that no appreciable power loss occurs between the power am amplifier and the associated antenna element;

each said power amplifier comprising a relatively low power, relatively low cost per watt linear power amplifier chip;

a first RF to fiber transceiver mounted on said tower/support structure and operatively coupled with said antenna structure; and a second RF to fiber transceiver mounted adjacent a base portion of said tower/support structure and coupled with said first RF transceiver by an optical fiber cable.

20. A method of installing an antenna system on a tower/support structure, said method comprising:

mounting a plurality of antenna elements arranged in an antenna array on said tower/support structure;

coupling a power amplifier comprising a relatively low power, relatively low cost per watt linear power amplifier chip with each of said antenna elements mounted closely adjacent to the associated antenna element, such that no appreciable power loss occurs between the power amplifier and the associated antenna element; and mounting a first RF to fiber transceiver on said tower/support structure, and coupling said first RF to fiber transceiver with said antenna structure; and mounting a second RF to fiber transceiver adjacent a base portion of said tower/support structure, and coupling said second RF to fiber transceiver with said first RF to fiber transceiver by an optical fiber cable.

21. A distributed flat panel antenna device comprising:

a first dielectric surface;

a plurality of substantially flat transmit antenna elements, and a plurality of substantially flat receive antenna elements located on said first dielectric surface;

a second dielectric surface closely spaced and substantially parallel to said first dielectric surface;

at least one low noise amplifier mounted to said second dielectric surface for receiving and amplifying signals from at least one of said receive antenna elements;

a plurality of power amplifiers, a power amplifier being operatively coupled with each of said transmit antenna elements and mounted to said second dielectric surface closely adjacent to the associated transmit antenna element, such that no appreciable power loss occurs between the power amplifier and the associated antenna element; and each said power amplifier comprising a relatively low power, relatively low cost per watt linear power amplifier; and a stripline feed network mounted to said second dielectric surface and operatively coupled with said power amplifiers and said at least one low noise amplifier, and aperture-coupled with each of said antenna elements;

said device being configured such that said transmit antenna elements and said power amplifiers coupled thereto, and said receive antenna elements and said at least one low noise amplifier coupled thereto are continuously active and capable of simultaneous respective transmit and receive operations;

wherein said transmit antenna elements are spaced apart to achieve a given beam pattern and no more than a given amount of mutual coupling, and wherein said receive antenna elements are spaced apart to achieve a given beam pattern and no more than a given amount of mutual coupling.

22. The antenna device of claim 21 wherein each said power amplifier chip has an output power not greater than about one watt.

23. The antenna device of claim 21 and further including a plurality of low noise amplifiers, each operatively coupled with one of said receive antenna elements.

24. The antenna device of claim 21 wherein each antenna element is a dipole.

25. The antenna device of claim 21 wherein each antenna elements is a monopole.

26. The antenna device of claim 21 wherein each antenna element is a microstrip/patch antenna element.

27. The antenna device of claim 21 wherein a single low noise amplifier is operatively coupled to a summed output of all of said receive antenna elements.

28. The antenna device of claim 21 and further including a low power frequency diplexer operatively coupled with all of said power amplifiers for coupling a single RF cable to all of said transmit and receive antenna elements.

29. The antenna device of claim 21 wherein said receive antenna elements are in a first linear array and said transmit antenna elements are in a second linear array spaced apart from and parallel to said first linear array.

30. The antenna device of claim 21 wherein a single transmit RF cable is coupled to all of said power amplifiers to carry signals to be transmitted to said antenna device and a single receive RF cable is coupled to said at least one low noise amplifier to carry received signals away from said antenna device.

31. The antenna device of claim 21 wherein feed network comprises one of a series and a parallel corporate feed structure.

32. The device of claim 21 wherein said transmit antenna elements and said receive antenna elements comprise separate arrays of antenna elements and wherein said transmit antenna elements are polarized in one polarization and the receive antenna elements are polarized orthogonally to the polarization of said transmit antenna elements.

33. The antenna device of claim 21 wherein said feed includes a transmit corporate feed structure operatively coupled with said transmit antenna elements and a receive corporate feed structure operatively coupled with said receive antenna elements, and wherein one or both of said corporate feed structures are adjusted to cause the transmit beam pattern and receive beam pattern to be substantially similar.

34. The device of claim 21 wherein a single array of patch antenna elements functions as both said transmit antenna elements and said receive antenna elements, and further including a transmit feed stripline and a receive feed stripline coupled to each of said patch antenna elements, said transmit feed stripline and said receive feed stripline being oriented orthogonally to each other at least in a region where they are coupled with each said patch element.

35. The device of claim 21 wherein a single array of patch antenna elements functions as both said transmit antenna elements and said receive antenna elements; and further including a frequency diplexer operatively coupled with each said patch antenna element, said plurality of power amplifiers and said at least one low noise amplifier being coupled in circuit with said frequency diplexer.

36. The antenna device of claim 35 wherein each said frequency diplexer has a receive output and wherein a single low noise amplifier is coupled to a summed junction of said receive outputs.

37. A method of operating a distributed antenna comprising:

arranging a plurality of substantially flat transmit antenna elements in an array on a first dielectric surface;

arranging a plurality of substantially flat receive antenna elements in an array on said first dielectric surface;

coupling a power amplifier with each of said transmit antenna elements and mounting said power amplifiers closely adjacent to the associated transmit antenna element, such that no appreciable power loss occurs between the power amplifier and the associated antenna element;

providing at least one low noise amplifier built into said distributed antenna for receiving and amplifying signals from at least one of said receive antenna elements;

aperture coupling a stripline feed network on a second dielectric surface with said antenna elements, and operatively coupling said stripline feed network to said power amplifiers and said at least one low noise amplifier;

simultaneously transmitting from said transmit antenna elements and receiving from said receive antenna elements; and spacing said transmit antenna elements apart to achieve a given beam pattern and no more than a given amount of mutual coupling, and spacing said receive antenna elements apart to achieve a given beam pattern and no more than a given amount of mutual coupling.

38. The method of claim 37 wherein a plurality of low noise amplifiers are provided, each operatively coupled with one of said receive antenna elements.

39. The method of claim 37 and further including summing the outputs of all of said receive antenna elements and coupling the summed output to a single low noise amplifier.

40. The method of claim 37 and further including coupling a low power frequency diplexer with all of said power amplifiers and coupling a single RF cable to all of said transmit and receive antenna elements via said diplexer.

41. The method of claim 37 and further including arranging said receive antenna elements in a first linear array and arranging said transmit antenna elements in a second linear array spaced apart from and parallel to said first linear array.

42. The method of claim 37 and further including coupling a single transmit RF cable to all of said power amplifiers to carry signals to be transmitted to said transmit antenna elements and coupling a single receive RF cable to said at least one low noise amplifier to carry received signals away from said receive antenna elements.

43. The method of claim 37 and further including polarizing said transmit antenna elements in one polarization and polarizing the receive antenna elements orthogonally to the polarization of said transmit antenna elements.

44. The method of claim 37 wherein said aperture coupling comprises coupling a transmit corporate feed structure with said transmit antenna elements and a receive corporate feed structure with said receive antenna elements, and adjusting one or both of said corporate feed structures to cause the transmit beam pattern and receive beam pattern to be substantially similar.

45. The method of claim 37 wherein a single array of patch antenna elements functions as both said transmit antenna elements and said receive antenna elements, and further including coupling a transmit feed stripline and a receive feed stripline to each of said patch antenna elements, and orienting said transmit feed stripline and said receive feed stripline orthogonally to each other at least in a region where they are coupled with each said patch element.

46. An antenna device comprising:

a plurality of transmit antenna elements in a linear array;

a plurality of receive antenna elements in a linear array; and a plurality of power amplifiers, a power amplifier being operatively coupled with each of said transmit anatenna elements;

at least one low noise amplifier for receiving and amplifying signals from at least one of said receive antenna elements;

the transmit antenna elements and said power amplifiers coupled thereto, and the receive antenna elements and said at least one low noise amplifier coupled thereto being capable of simultaneous respective transmit and receive operations;

an electrically conductive element positioned between the linear arrays.

47. The antenna device of claim 46 wherein said receive antenna elements, said transmit antenna elements and said conductive element are all mounted to a common backplane.

48. The antenna device of claim 47 wherein all of said power amplifiers are also mounted to said backplane.

49. A distributed antenna device comprising:

a plurality of transmit antenna elements;

a plurality of receive antenna elements; and a power amplifier being operatively coupled with each of said transmit antenna elements;

at least one low noise amplifier for receiving and amplifying signals from at least one of said receive antenna elements;

said transmit antenna elements and said receive antenna elements being arranged in a single linear array in alternating order.

50. The distributed antenna device of claim 49 wherein said transmit antenna elements are polarized in one polarization and the receive antenna elements are polarized orthogonally to the polarization of said transmit antenna elements.

* * * * *

UNITED STATES PATENT AND TRADEMARK OFFICE

CERTIFICATE OF CORRECTION

PATENT NO. : 6,597,325 B2 
DATED : July 22, 2003
INVENTOR(S) : Mano D. Judd et al.

It is certified that error appears in the above-identified patent and that said Letters Patent is hereby corrected as shown below:

<u>Title page,</u>
Item [56], References Cited, U.S. PATENT DOCUMENTS, after "5,825,762 A", please delete "8/1986 Halgrimson" and insert -- 10/1998 Kamin, Jr. et al. ............ 370/335 -- therefor; and please insert the following references:

| | | | | |
|---|---|---|---|---|
| -- 5,437,052 A | 7/1995 | Hemmie et al. | .................. | 455/5.1 |
| 5,784,031 A | 7/1998 | Weiss et al. | ..................... | 342/373 |
| 5,933,113 A | 8/1999 | Newberg et al. | ................ | 342/375 |
| 6,020,848 A | 2/2000 | Wallace et al. | ................... | 342/362 |
| 6,047,199 A | 4/2000 | DeMarco | .......................... | 455/572 |
| 6,160,514 A | 12/2000 | Judd | .................................. | 343/700 |
| 6,240,274 A | 5/2001 | Izadpanah | .......................... | 455/39 |
| 6,269,255 A | 7/2001 | Waylett | ............................. | 455/562 -- |

<u>Column 5,</u>
Line 12, please delete the word "is" between the words "a" and "wavelength".
Line 34, after "aluminum,", please delete "30".

<u>Column 11,</u>
Line 57, please delete the word "am" between the words "power" and "amplifier".

Signed and Sealed this

Twentieth Day of April, 2004

JON W. DUDAS
*Acting Director of the United States Patent and Trademark Office*